March 2, 1937.  R. S. C. FOW  2,072,165
PLANT FEEDER AND SUPPORT
Filed Dec. 12, 1935
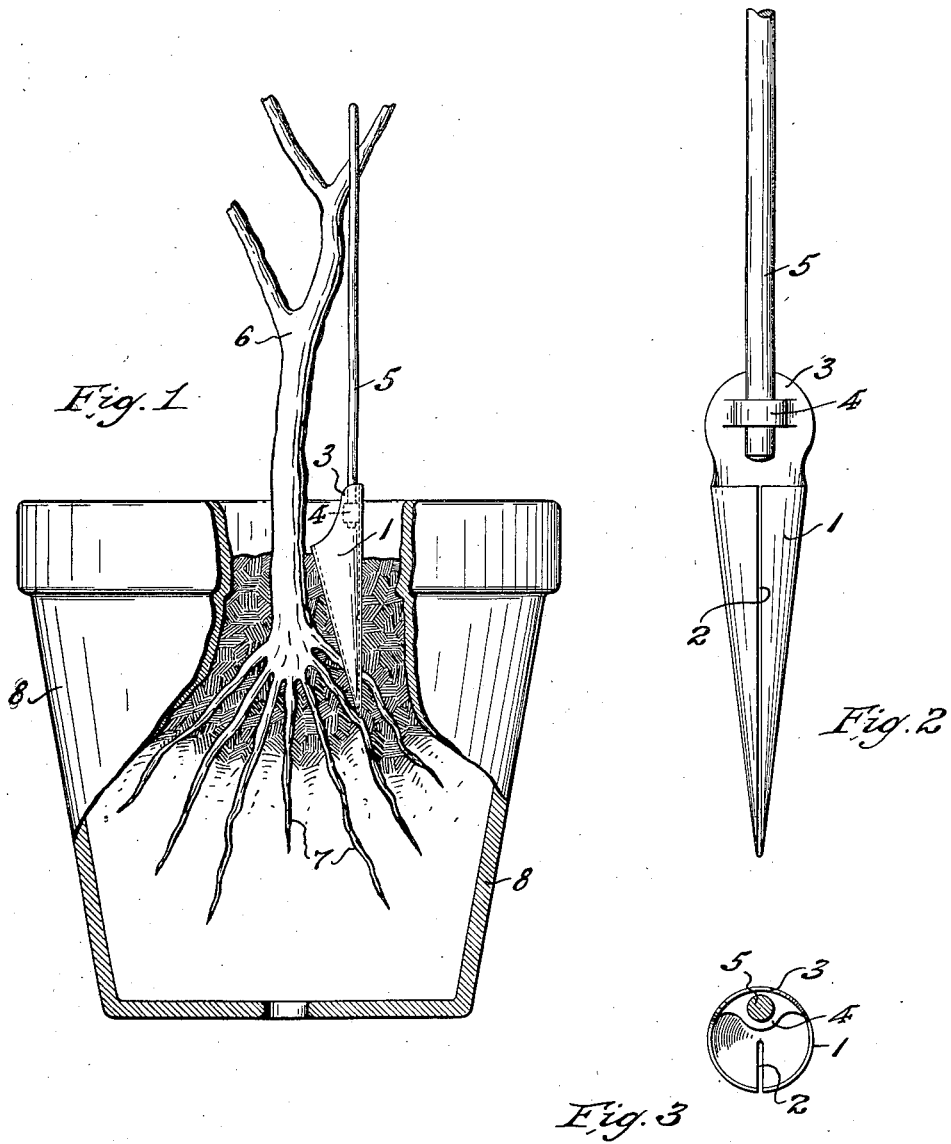
INVENTOR.
Raymond S. C. Fow,
BY George D. Richards
ATTORNEY.

Patented Mar. 2, 1937

2,072,165

UNITED STATES PATENT OFFICE 2,072,165

PLANT FEEDER AND SUPPORT

Raymond S. C. Fow, Newark, N. J., assignor to En-Der-Company, Inc., Newark, N. J., a corporation of New Jersey Application December 12, 1935, Serial No. 54,138

2 Claims. (Cl. 47—47)

This invention relates to an improved means for treating plant and vegetable growths; and the invention has reference, more particularly, to a novel means for administering moisture and plant-benefiting material to the soil in which the root processes of a plant extend, said means also including a support holder adapted to dispose a support adjacent to the above-soil growth of the plant in such manner that the support does not contact with the soil, and consequently is prevented from absorbing moisture therefrom.

This invention has for its object to provide a novel device for the purposes mentioned which comprises a combined feeder and support holder for plants consisting in an inverted conical receptacle for insertion into the soil adjacent to a plant, said receptacle being adapted to receive and dispense a quantity of plant benefiting material; said receptacle having a lengthwise extending relatively narrow slot through which, when the receptacle is inserted in the soil adjacent to a plant, the contained plant benefiting material is slowly fed to the plant's roots; said receptacle being further provided at its upper open end with an upstanding lip for projection above the soil surface, which lip is suitably provided with means for holding the lower end of an upwardly extending staff or support to which the above-soil growth of the plant may be suitably attached and thereby, in turn, supported; said staff or support being thus erected wholly above and out of contact with the soil so as to be prevented from absorbing moisture therefrom.

An illustrative embodiment of this invention is shown in the accompanying drawing, in which:

Fig. 1 shows a side elevation, partly in section, of potted plant, feeder and support; Fig. 2 is a front view of feeder and support; and Fig. 3 is a plan view of feeder with support in section.

Similar characters of reference are employed in the above-described views, to indicate corresponding parts.

Referring to the drawing, the reference character I indicates the feeder receptacle, the same comprising a hollow body of inverted conical shape. The feeder receptacle may be made of any suitable material, such e. g. as sheet metal. Extending lengthwise of the receptacle body I is a relatively narrow slot 2. This slot, in the preferred form of the invention, extends from the upper open end of the receptacle body downwardly therethrough so as to terminate adjacent to the apex thereof. At its upper end, a portion of the wall of the receptacle body, at a side thereof opposite to that in which said slot 2 is located, is upwardly extended to provide an up-standing lip 3 which projects above the upper open mouth of said body. Provided in connection with said lip 3, preferably at the inner face thereof, is a means for holding a plant support. This means may be variously formed either integrally with said lip 3 or as a separate element suitably secured thereto, and essentially comprises a socketed member or bracket 4. Secured by its lower end in said socketed member or bracket 4 is a staff or rod-like support 5, adapted to project upwardly therefrom and above the mouth of the receptacle body.

The device, as above described, may be used to serve either out-door growing plants or potted plants. In the drawing, the device is shown as applied to a potted plant 6, the plant roods 7 being imbedded in the soil contained in the pot 8. In applying the device to such potted plant, the apex of the inverted conical feeder receptacle I is thrust into the soil adjacent to the plant roots 7, with its upper open end slightly above the soil surface. Such location of the receptacle I disposes the lip 3 in upstanding position entirely above the soil and adjacent to the main stalk or body of the plant 6, so that the staff or rod-like support 5 extends upwardly adjacent to the latter, thus affording a support to which the above-soil growth may be suitably attached. Ordinarily staffs or supports for plants are made of wood and are usually themselves supported by thrusting the lower ends thereof into the soil in which the plant grows. Such practice is more or less detrimental to the plant, since, owing to the moisture absorbent character of wood in contact with the soil, plant benefiting moisture is carried away thereby which otherwise would be available to the plant roots. It will be noticed that, in the device of this invention, the staff or support 5 is held wholly above and has no contact with the soil, and consequently cannot effect the moisture robbing action above referred to.

In use, water and other plant benefiting material is deposited in the soil penetrating feeder receptacle, from whence it is slowly dispensed through slot 2 to the soil and adjacent plant roots, thereby promoting healthy plant growth by controlled feeding.

It will be understood that various changes may be made in the above described constructions, and many apparently widely different embodiments of this invention could be made without departing from the scope thereof as defined by the following claims. It is therefore intended that all matter contained in the above description or shown in the accompanying drawing shall be interpreted as ilustrative and not in a limiting sense.

I claim:

1. A combined feeder and support for plants comprising a conical receptacle with a slot and a lip, said receptacle adapted to receive plant-benefiting material, said slot extending substantially from the base to the point of the cone and being of sufficient width to pass said plant-benefiting material slowly to the plant's roots, said lip upstanding from the cone's base diametrically opposite said slot and having means to receive and hold the lower end of said support.

2. A combined feeder and support for plants comprising a soil penetratable receptacle having an upper open end and a slot through the wall thereof, said receptacle adapted to receive plant-benefiting material and slowly dispense the same through said slot to the plant's roots, a lip upstanding from the open end of said receptacle, a plant supporting staff, and said lip having means for holding the lower end of said staff to dispose the same erect wholly above and out of contact with the soil and thereby prevented from absorbing moisture therefrom.

R. S. C. FOW.